US011055373B2

(12) United States Patent
Yuan et al.

(10) Patent No.: US 11,055,373 B2
(45) Date of Patent: Jul. 6, 2021

(54) METHOD AND APPARATUS FOR GENERATING INFORMATION

(71) Applicant: BEIJING BAIDU NETCOM SCIENCE AND TECHNOLOGY CO., LTD., Beijing (CN)

(72) Inventors: Pengcheng Yuan, Beijing (CN); Renkai Yang, Beijing (CN); Xunchao Song, Beijing (CN); Xiaobo Liu, Beijing (CN); Xinwei Feng, Beijing (CN)

(73) Assignee: Beijing Baidu Netcom Science and Technology Co., LTD., Beijing (CN)

( * ) Notice: Subject to any disclaimer, the term of this patent is extended or adjusted under 35 U.S.C. 154(b) by 287 days.

(21) Appl. No.: 16/133,483

(22) Filed: Sep. 17, 2018

(65) Prior Publication Data

US 2019/0179965 A1 Jun. 13, 2019

(30) Foreign Application Priority Data

Dec. 13, 2017 (CN) .......................... 201711327540.0

(51) Int. Cl.
*G06F 16/9535* (2019.01)
*G06F 40/247* (2020.01)
*G06F 16/955* (2019.01)

(52) U.S. Cl.
CPC ...... *G06F 16/9535* (2019.01); *G06F 16/9566* (2019.01); *G06F 40/247* (2020.01)

(58) Field of Classification Search
CPC ............................ G06F 16/9535; G06F 40/279
USPC .................................................. 707/706, 707
See application file for complete search history.

(56) References Cited

U.S. PATENT DOCUMENTS

2015/0278376 A1* 10/2015 Qin ..................... G06F 16/9535
707/706
2017/0357712 A1* 12/2017 Zhu ........................ G06F 16/328

FOREIGN PATENT DOCUMENTS

CN 102722498 10/2012
CN 102760134 10/2012

OTHER PUBLICATIONS

Li, Yanan, A Survey of Query Suggestion in Search Engine, Journal of Chinese Information Processing, 24(6):75-78 (2010).

* cited by examiner

*Primary Examiner* — Robert W Beausoliel, Jr.
*Assistant Examiner* — Pedro J Santos
(74) *Attorney, Agent, or Firm* — Knobbe, Martens, Olson & Bear LLP (57) ABSTRACT

Embodiments of the disclosure disclose a method and apparatus for generating information. A specific embodiment of the method comprises: acquiring a historical click log, the historical click log comprising a historical search term and a clicked historical search result corresponding to the historical search term; determining whether matching clicked historical search results exist in the historical click log; establishing a synonymous relationship between historical search terms corresponding to the matching clicked historical search results, in response to determining the matching clicked historical search results existing in the historical click log; and generating a relational word list based on the established synonymous relationship. The embodiment helps to enrich the content of the relational word list, and improve the coverage of the relational word list.

11 Claims, 5 Drawing Sheets

METHOD AND APPARATUS FOR
GENERATING INFORMATION

CROSS-REFERENCE TO RELATED
APPLICATIONS

This application is related to and claims priority from Chinese Application No. 201711327540.0, filed on Dec. 13, 2017 and entitled "Method and Apparatus for Generating Information," the entire disclosure of which is hereby incorporated by reference.

TECHNICAL FIELD

Embodiments of the disclosure relate to the field of computer technology, specifically to the field of information retrieval technology, and more specifically to a method and apparatus for generating information.

BACKGROUND

Information retrieval is generally the main method for users to query and acquire information, and is the method and means for searching for information. Information retrieval usually has a broad and narrow sense.

The information retrieval in the narrow sense generally refers only to information query, i.e., a search process in which a user searches an information set for required information as needed using a certain method with the help of a search tool. The information retrieval in the broad sense is generally a process of processing, organizing and storing information in a certain way, and then accurately searching for relevant information based on specific needs of the information users, and is also known as the storage and retrieval of information. In general, information retrieval refers to the information retrieval in the broad sense.

SUMMARY

Embodiments of the disclosure present a method and apparatus for generating information.

In a first aspect, an embodiment of the disclosure provides a method for generating information, including: acquiring a historical click log, the historical click log including a historical search term and a clicked historical search result corresponding to the historical search term; determining whether matching clicked historical search results exist in the historical click log; establishing a synonymous relationship between historical search terms corresponding to the matching clicked historical search results, in response to determining the matching clicked historical search results existing in the historical click log; and generating a relational word list based on the established synonymous relationship.

In some embodiments, the historical search result includes a uniform resource locator (URL); and the determining whether matching clicked historical search results exist in the historical click log includes: determining whether there is an identical URL in the clicked historical search results in the historical click log.

In some embodiments, the historical search result includes title information; and the determining whether matching clicked historical search results exist in the historical click log includes: determining whether there is identical or similar title information in the clicked historical search results in the historical click log.

In some embodiments, the method further includes: determining, for clicked historical search results corresponding to historical search terms having a synonymous relationship, whether an identical character string exists between pieces of title information; establishing a near-synonymous relationship between the character string and the corresponding historical search terms, in response to determining the identical character string existing between the pieces of title information; and storing the established near-synonymous relationship into the relational word list.

In some embodiments, the generating a relational word list based on the established synonymous relationship includes: selecting historical search terms having a synonymous relationship meeting a preset condition using statistical machine translation based on the established synonymous relationship, and generating a relational word list.

In some embodiments, the method further includes: receiving a search request sent by a user, and acquiring a search result corresponding to the search request; matching the search request in the relational word list; marking a target character string in the search result if a search term matching a word in the relational word list exists in the search request, wherein the target character string is a character string including a word, in the relational word list, having a relationship with the matched search term in the search request; and generating a page including the search result, and sending the page to the user.

In a second aspect, an embodiment of the disclosure provides an apparatus for generating information, including: an acquiring unit, configured for acquiring a historical click log, the historical click log including a historical search term and a clicked historical search result corresponding to the historical search term; a determining unit, configured for determining whether matching clicked historical search results exist in the historical click log; a first establishing unit, configured for establishing a synonymous relationship between historical search terms corresponding to the matching clicked historical search results, in response to determining the matching clicked historical search results existing in the historical click log; and a generating unit, configured for generating a relational word list based on the established synonymous relationship.

In some embodiments, the historical search result includes a uniform resource locator (URL); and the determining unit is further configured for: determining whether there is an identical URL in the clicked historical search results in the historical click log.

In some embodiments, the historical search result includes title information; and the determining unit is further configured for: determining whether there is identical or similar title information in the clicked historical search results in the historical click log.

In some embodiments, the apparatus further includes: a determining unit, configured for determining, for clicked historical search results corresponding to historical search terms having a synonymous relationship, whether an identical character string exists between pieces of title information; a second establishing unit, configured for establishing a near-synonymous relationship between the character string and the corresponding historical search terms, in response to determining the given character string existing between the pieces of title information; and a storing unit, configured for storing the established near-synonymous relationship into the relational word list.

In some embodiments, the generating unit is further configured for: selecting historical search terms having a synonymous relationship meeting a preset condition using statistical machine translation based on the established synonymous relationship, and generating a relational word list.

In some embodiments, the apparatus further includes: a receiving unit, configured for receiving a search request sent by a user, and acquiring a search result corresponding to the search request; a matching unit, configured for matching the search request in the relational word list; a marking unit, configured for marking a target character string in the search result if a search term matching a word in the relational word list exists in the search request, wherein the target character string is a character string including a word, in the relational word list, having a relationship with the matched search term in the search request; and a sending unit, configured for generating a page including the search result, and sending the page to the user.

In a third aspect, an embodiment of the disclosure provides an electronic device, including: one or more processors; and a memory, for storing one or more programs, where the one or more programs enable, when executed by the one or more processors, the one or more processors to implement the method according to any one embodiment in the first aspect.

In a fourth aspect, an embodiment of the disclosure provides a computer readable storage medium storing a computer program therein, where the computer program implements, when executed by a processor, the method according to any one embodiment in the first aspect.

The method and apparatus for generating information according to the embodiments of the disclosure acquire a historical click log, thereby determining whether matching clicked historical search results exist in the historical click log. Here, the historical click log may include a historical search term and a clicked historical search result corresponding to the historical search term. A synonymous relationship between historical search terms corresponding to the matching clicked historical search results may be established in response to determining the matching clicked historical search results existing in the historical click log. That is, the historical search terms having a synonymous relationship are determined based on the clicked historical search results, thereby generating a relational word list based on the established synonymous relationship. This helps to enrich the content of the relational word list, and improve the coverage of the relational word list.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
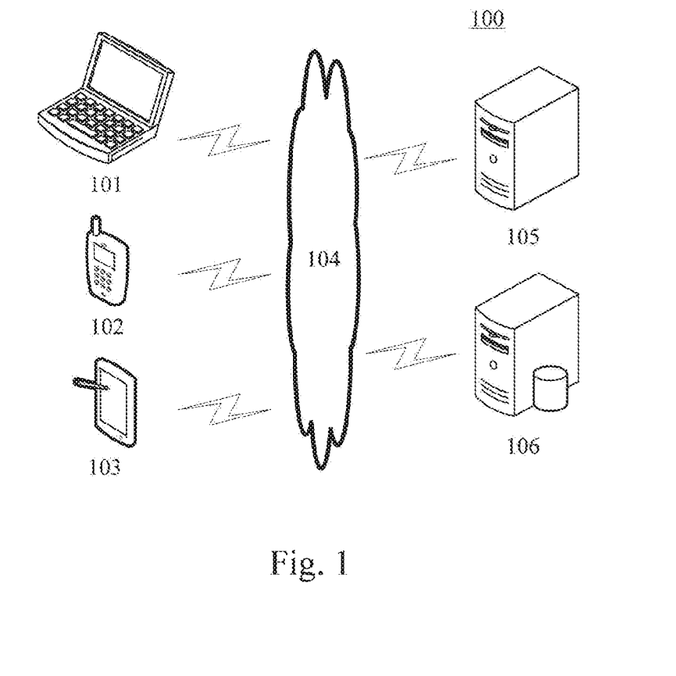
FIG. 1 is an architectural diagram of a system in which some embodiments of the present disclosure may be implemented.

FIG. 1 shows an architecture of a system 100 which may be used by a method for generating information or an apparatus for generating information according to the embodiments of the present disclosure.

As shown in FIG. 1, the system architecture 100 may include terminal devices 101, 102 and 103, a network 104, a server 105 and a database server 106. The network 104 serves as a medium providing a communication link between the terminal devices 101, 102 and 103, the server 105 and the database server 106. The network 104 may include various types of connections, such as wired or wireless transmission links, or optical fibers.

The user may use the terminal devices 101, 102 and 103 to interact with the server 105 and the database server 106 through the network 104, to receive or transmit messages. Various client applications, such as webpage browsers, search applications, shopping applications, and instant messaging tools may be installed on the terminal devices 101, 102 and 103.

The terminal devices 101, 102 and 103 may be various electronic devices having display screens, including but not limited to, smart phones, tablet computers, laptop computers, electronic readers and desktop computers.

The database server 106 may be a server providing various services, for example, the database server 106 may store the historical click log. The historical click log comprising a historical search term and a clicked historical search result corresponding to the historical search term.

The server 105 may also be a server providing various services, for example, a backend server that provides support for various applications displayed on the terminal devices 101, 102 and 103. The backend server may perform a processing including analyzing the historical click log acquired from the database server 106, to generate a relational word list. At the same time, the backend server may also perform analyzing and processing on the search request sent by the terminal devices 101, 102 and 103, and send the processing result (e.g., a page including the search result) to the terminal devices 101, 102 and 103.

It should be noted that the method for generating information according to the embodiments of the present disclosure is generally executed by the server 105. Accordingly, an apparatus for generating information is generally installed on the server 105.

It should be noted that when the server 105 has functions of the database server 106, the system architecture 100 may not include the database server 106.

It should be appreciated that the numbers of the terminal devices, the networks, the servers and the database servers in FIG. 1 are merely illustrative. Any number of terminal devices, networks, servers and database servers may be provided based on the actual requirements.

Figure 2:
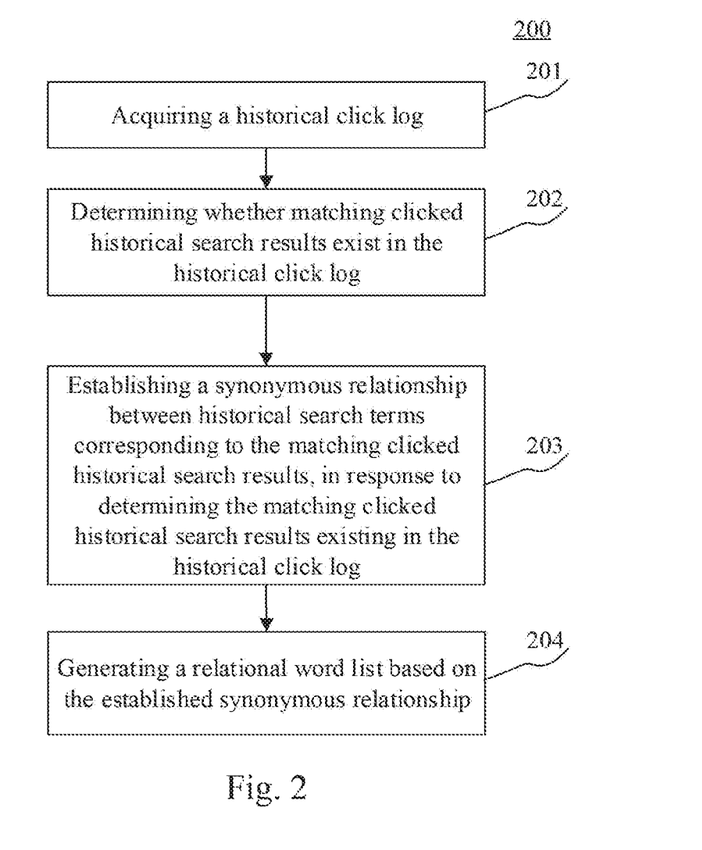
FIG. 2 is a flowchart of an embodiment of a method for generating information according to the disclosure.

Please further refer to FIG. 2, FIG. 2 shows a process 200 of an embodiment of a method for generating information according to the disclosure. The method for generating information may include the following steps.

Step 201: acquiring a historical click log.

In the embodiment, an electronic device (e.g., the server 105 shown in FIG. 1) in which the method for generating information is performed may acquire a historical click log using various methods. Here, the historical click log may include a historical search term and a clicked historical search result corresponding to the historical search term.

For example, the electronic device may acquire a historical click log from a database server (e.g., the database server 106 shown in FIG. 1) in communication connection with the electronic device or a terminal (e.g., the terminal 101, 102 or 103 shown in FIG. 1). A search engine may be installed on the database server or the terminal. When a user searches using a search engine and clicks to have an access to a relevant search result, the database server or the terminal may record the user's operation behavior information, thereby generating and storing the historical click log. Alternatively, the database server or the terminal may upload the user's operation behavior information to the cloud server. The cloud server processes such information to generate and store the historical click log.

As another example, a search engine may also be installed on the electronic device, or the electronic device may provide support for the search engine on the terminal. Under this circumstance, the electronic device may record the user's operation behavior information, and store the generated historical click log locally. In this way, the electronic device may acquire a historical click log locally. As will be appreciated, the way of generating the historical click log and the specific storage address thereof are not limited in the disclosure.

Here, the historical search term may include one or more of characters, such as a number, a letter, or a text. The historical search term may be a word used for searching for contents, such as news, an image, a video, a commodity, or a document. The historical search result may be a content associated with the historical search term, such as news, a video, an image, a document, or a commodity. The search result may include at least one of following items: a URL (uniform resource locator), title information, content introduction, or an image.

Step 202: determining whether matching clicked historical search results exist in the historical click log.

In the embodiment, for the historical click log acquired in the step 201, the electronic device may determine whether matching clicked historical search results exist in the historical click log in various ways. For example, among clicked historical search results, if two historical search results include the same character string, then the electronic device may determine that the two historical search results match.

In some optional implementations of the embodiment, the historical search result may include a URL. Here, the electronic device may determine whether the same URL exists in the clicked historical search results in the historical click log. For example, the electronic device may first determine whether two clicked URLs have the same length (character count); compare characters at the same position in the two URLs one by one if the two clicked URLs have the same length; and determine the two URLs being identical if the characters at the same position are identical respectively.

Optionally, the historical search result may also include title information. Here, the title information may include one or more of characters, such as a number, a letter, or a text. Under this circumstance, the electronic device may determine whether there is identical or similar title information in the clicked historical search results in the historical click log. For example, the electronic device may first segment words in two pieces of title information; then calculate a similarity between the two pieces of title information using semantic analysis or the like; and determine the two pieces of title information being similar if the similarity is greater than a preset similarity threshold (e.g., 0.8). As will be appreciated, if the similarity approaches 1 or is 1, then the two pieces of title information may be determined as identical.

It should be noted that the method for determining whether the clicked historical search results match is not limited in the disclosure. A specific matching method may be set based on the practical situation.

Step 203: establishing a synonymous relationship between historical search terms corresponding to the matching clicked historical search results, in response to determining the matching clicked historical search results existing in the historical click log.

In the embodiment, the electronic device may establish a synonymous relationship between historical search terms corresponding to the matching clicked historical search results, if the electronic device determines the matching clicked historical search results existing in the historical click log based on the result determined in the step 202.

For example, for a historical search term Q1, clicked historical search results associated with the Q1 include URL1 and URL2; while for a historical search term Q2, clicked historical search results associated with the Q2 include URL3 and URL4. Here, if the electronic device determines URL2 matching URL3, then a synonymous relationship between the Q1 and Q2 may be established. That is, if there are matching historical search results among historical search results corresponding to different historical search terms, then it may be considered that there is a synonymous relationship between historical search terms corresponding to the matching historical search results.

In the embodiment, the method for establishing a synonymous relationship is not limited in the disclosure, for example, adding the same identifier to historical search terms having a synonymous relationship, or establishing a link therebetween.

Step 204: generating a relational word list based on the established synonymous relationship.

In the embodiment, the electronic device may generate a relational word list based on the synonymous relationship established in the step 203. Here, the relational word list is used for representing a relationship between words.

In some optional implementations of the embodiment, the electronic device may count all historical search terms having synonymous relationships, and perform deduplication. Then, the historical search terms having synonymous relationships are recorded in a pre-established list, thereby generating a relational word list.

Optionally, in order to improve the accuracy and compactness of the relationship between words in the relational word list, the electronic device may also select historical search terms having a synonymous relationship meeting a preset condition (e.g., a statistical probability of a synonymous relationship greater than 70%) using statistical machine translation (SMT) based on the established synonymous relationship. This further helps to reduce the word count in the relational word list and improve the processing efficiency. Here, the preset condition may be set based on practical needs.

Here, the statistical machine translation is a kind of machine translation, and is also a kind of machine translation with better performance in a non-limiting field. The basic idea of the statistical machine translation is to establish a statistical translation model through statistical analysis on a considerable amount of parallel corpora, and then use this model for translation. That is, a probability of outputting the search term Q2 having a synonymous relationship with the Q1 may be collected after inputting the search term Q1 into the model using statistical machine translation.

Furthermore, in order to improve the accuracy and coverage of the relational word list, the electronic device may also determine whether the same character string exists between pieces of title information for clicked historical search results corresponding to historical search terms having a synonymous relationship. If determining the same character string existing between the pieces of title information, the electronic device may establish a near-synonymous relationship between the character string and the corresponding historical search terms; and store the established near-synonymous relationship into the relational word list.

For example, for the historical search terms Q1 and Q2 having a synonymous relationship, if the same character string C1 exists between title information in a clicked historical search result corresponding to the Q1 and title information in a clicked historical search result corresponding to the Q2, then the electronic device may establish a near-synonymous relationship between C1 and Q1 & Q2, and store the near-synonymous relationship into the generated relational word list. It should be noted that, in order to further improve the processing efficiency and the accuracy of the relational word list, the historical search terms having a synonymous relationship here may be words in the relational word list.

As will be appreciated, a user is often free to express a search intention, i.e., there may be typos, missing words, or a variety of abbreviations in a search request. That is, search terms used by users are usually not standard, or are not always a popular word. Analyzing a considerable amount of users' historical click logs to find out a co-occurrence behavior thereof helps to increase the word count in the relational word list, enrich the relationship between words, and then improve the coverage of the relational word list.

Figure 3:
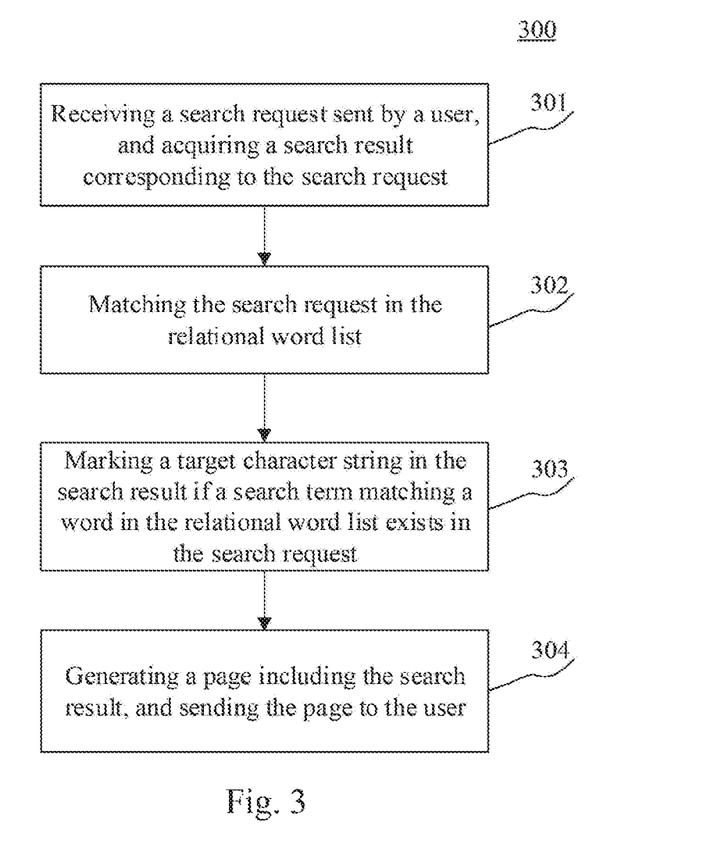
FIG. 3 is a flowchart of another embodiment of a method for generating information according to the disclosure.

Furthermore, the method for generating information according to the embodiment may further include processing a search request sent by a user using the generated relational word list, which may be specifically referred to relevant description in the embodiment shown in FIG. 3, and is not repeatedly described any more here.

The method for generating information according to the embodiment acquires a historical click log, thereby determining whether matching clicked historical search results exist in the historical click log. Here, the historical click log may include a historical search term and a clicked historical search result corresponding to the historical search term. A synonymous relationship between historical search terms corresponding to the matching clicked historical search results may be established in response to determining the matching clicked historical search results existing in the historical click log. That is, the historical search terms having a synonymous relationship are determined based on the clicked historical search results, thereby generating a relational word list based on the established synonymous relationship. This helps to enrich the content of the relational word list, and improve the coverage of the relational word list.

Please further refer to FIG. 3, FIG. 3 shows a flow 300 of another embodiment of a method for generating information according to the disclosure. The method for generating information may include not only the steps in the embodiment in FIG. 2, but also following steps.

Step 301: receiving a search request sent by a user, and acquiring a search result corresponding to the search request.

In the embodiment, the electronic device (e.g., the server 105 shown in FIG. 1) in which the method for generating information is performed may receive a search request sent by a user through a wired connection or a wireless connection. Then the electronic device may acquire a search result associated with the search request from a database server (e.g., the database server 106 shown in FIG. 1) or locally using a common processing method (e.g., performing word segmentation and semantic analysis on the search request).

Here, the search request may be a request instructing to search for an image, a video, a document, or a commodity. The search request may include one or more of characters, such as a number, a letter, a symbol, or a text. The search request may also include one or more of characters, such as a number, a letter, a symbol, or a text. The content of the search result usually may include at least one of following items: title information, brief description, or a URL.

Step 302: matching the search request in the relational word list.

In the embodiment, the electronic device may match each word in the relational word list with the search request. For example, the electronic device may segment words in the search request to generate corresponding search terms, and then compare words in the relational word list with the search terms one by one. If there is a search term identical to a word in the relational word list, then successfully matching may be determined.

Step 303: marking a target character string in the search result if a search term matching a word in the relational word list exists in the search request.

In the embodiment, if a search term matching a word in the relational word list exists in the search request based on the matching result in the step 302, then the electronic device may mark a target character string in the search result corresponding to the search request. Here, the target character string is a character string including a word, in the relational word list, having a relationship with the matched search term in the search request.

For example, a search term A1 matching a word A1 in the relational word list exists in a search request Q1, and words A2 and A3 in the relational word list have a relationship with the word A1. In this case, the electronic device may mark a target character string (i.e., a character string including one or more of the word A1, the word A2 or the word A3) in the search result corresponding to the search request Q1.

In the embodiment, the marking method is not limited, for example, using any one or more of the methods, such as using a colored box (e.g., a red box), adding a background color, bolding a font, or enlarging a font size.

Step 304: generating a page including the search result, and sending the page to the user.

In the embodiment, after marking the target character string in the search result in the step 303, the electronic device may generate a page including all search results and may send the page to the user. Here, marked information may be displayed on the page. This may enable the user to pay more attention to the search result at the position of the marked information, thus stimulating the user's desire to click.

In some optional implementations of the embodiment, the electronic device may also sort the search results, and display the search results on the generated page in the sorted order. For example, the electronic device may count clicks of each search result based on the historical click log, for use as a reference parameter for sorting. For another example, the electronic device may also sort the search results based on the mark, such as sorting marked search results at the forefront. Furthermore, the electronic device may also count words in the relational word list included in the target character string of each search result, for use as a reference parameter for sorting.

The method for generating information provided by the embodiment may mark search results associated with the search request using the generated relational word list, and then send the marked search results to the user. This helps to enrich the marked contents and the coverage of marks.

Figure 4A:
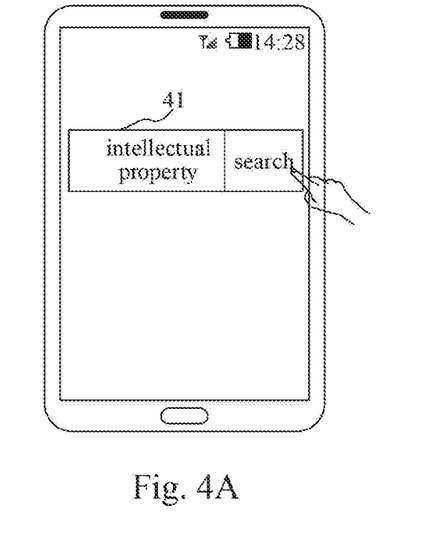
FIG. 4A and FIG. 4B are schematic diagrams of application scenarios of a method for generating information according to some embodiments of the disclosure.
Figure 4B:
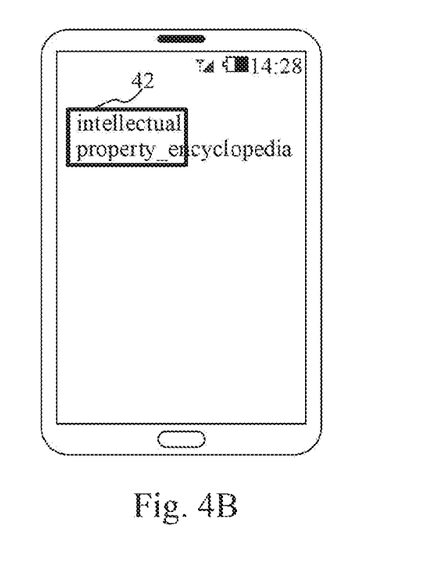

Please refer to FIG. 4A and FIG. 4B. FIG. 4A and FIG. 4B are schematic diagrams of application scenarios of a method for generating information according to the embodiment.

In the application scenario of FIG. 4A, the user may enter a search request "intellectual property" into an input box 41 of a browser displayed on a terminal, and click a search button to send the search request. After receiving the search request, the server may acquire a search result associated with the search request. Then, the server may mark the target character string in the search result based on the pre-generated relational word list, and generate a page including the search result. Finally, the server may send the page to the terminal. Here, the relational word list is generated by the server through analyzing the historical click log and then establishing a synonymous relationship between historical search terms corresponding to the matching clicked historical search results.

In the application scenario of FIG. 4B, the terminal may display the search result and marked information sent by the server for the user. Here, title information of the search result is "intellectual property Encyclopedia", and the characters "intellectual property" in the title information are marked with a red bold line box 42.

As will be appreciated, in a search product, marking is used to express matching of user's search terms in the result. Especially, in a commercial search product, a marked area has a significant influence on the advertising effect. Reasonable marking contributes to promoting core business of a user by the user, as well as control and perception of information by the user. Therefore, if the marked area is effectively extended based on the search request of the user, the user may have more abundant perception and a stronger desire to click, thereby enhancing the advertising revenue. The relational word list generated in the embodiment of the disclosure can not only increase the relational word count, but also help to enlarge the coverage area of the mark and improve the search effect of a long tail search term, thereby improving the user experience. Here, the long-tail search term is a long tail keyword, and generally refers to a keyword portfolio that is a non-target keyword on a website, is associated with a target keyword, and can also bring a search traffic. The long tail keyword is characterized by a great length, often includes 2-3 words or even phrases, exists on a content page, and exists in not only the title but also the content of the content page.

Figure 5:
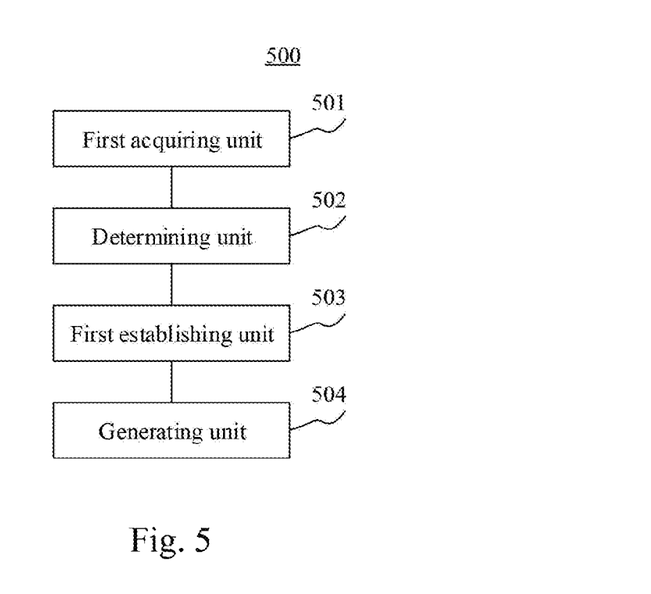
FIG. 5 is a structural schematic diagram of an embodiment of an apparatus for generating information according to the disclosure.

Please further refer to FIG. 5. As implementations of the method shown in the above figures, the disclosure provides an embodiment of an apparatus for generating information. The embodiment of the apparatus corresponds to the embodiment of the method shown in FIG. 2, and the apparatus may be specifically applied to a variety of electronic devices.

As shown in FIG. 5, an apparatus 500 for generating information according to the embodiment may include: an acquiring unit 501, configured for acquiring a historical click log, the historical click log including a historical search term and a clicked historical search result corresponding to the historical search term; a determining unit 502, configured for determining whether matching clicked historical search results exist in the historical click log; a first establishing unit 503, configured for establishing a synonymous relationship between historical search terms corresponding to the matching clicked historical search results, in response to determining the matching clicked historical search results existing in the historical click log; and a generating unit 504, configured for generating a relational word list based on the established synonymous relationship.

In the embodiment, specific implementations of the acquiring unit 501, the determining unit 502, the first establishing unit 503 and the generating unit 504, and beneficial effects produced thereby may be respectively referred to in relevant descriptions on the steps 201, 202, 203 and 204 in the embodiment shown in FIG. 2, and are not repeatedly described any more here.

In some optional implementations of the embodiment, the historical search result may include a uniform resource locator (URL); and the determining unit 502 may be further configured for: determining whether there is an identical URL in the clicked historical search results in the historical click log.

Optionally, the historical search result may further include title information; and the determining unit 502 may be further configured for: determining whether there is identical or similar title information in the clicked historical search results in the historical click log.

Furthermore, the apparatus 500 may further include: a determining unit (not shown in the figure), configured for determining, for clicked historical search results corresponding to historical search terms having a synonymous relationship, whether an identical character string exists between pieces of title information; a second establishing unit (not shown in the figure), configured for establishing a near-synonymous relationship between the character string and the corresponding historical search terms in response to determining the identical character string existing between the pieces of title information; and a storing unit (not shown in the figure), configured for storing the established near-synonymous relationship into the relational word list.

In some embodiments, the generating unit 504 may be further configured for: selecting historical search terms having a synonymous relationship meeting a preset condition using statistical machine translation based on the established synonymous relationship, and generating a relational word list.

Optionally, the apparatus 500 may further include: a receiving unit (not shown in the figure), configured for receiving a search request sent by a user, and acquiring a search result corresponding to the search request; a matching unit (not shown in the figure), configured for matching the search request in the relational word list; a marking unit (not shown in the figure), configured for marking a target character string in the search result if a search term matching a word in the relational word list exists in the search request, wherein the target character string is a character string including a word, in the relational word list, having a relationship with the matched search term in the search request; and a sending unit (not shown in the figure), configured for generating a page including the search result, and sending the page to the user.

Figure 6:
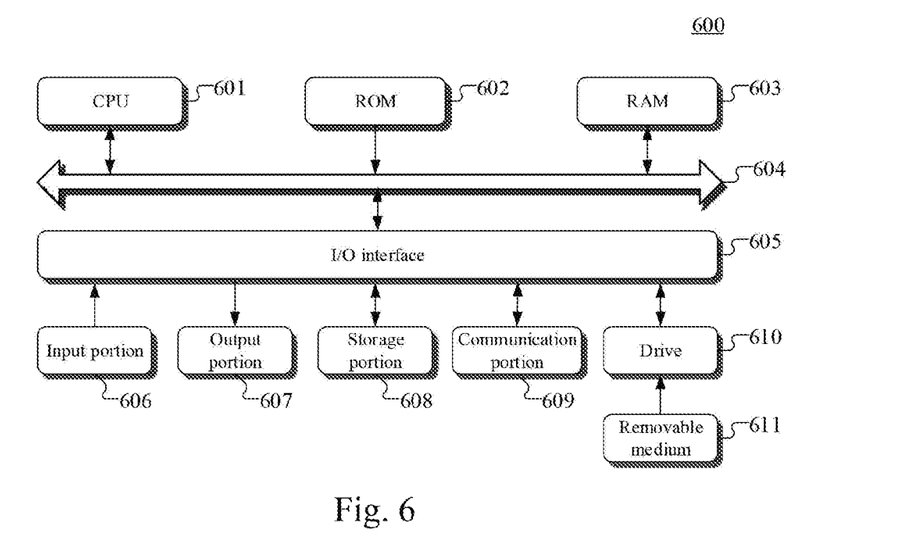
FIG. 6 is a structural schematic diagram of a computer system adapted to implement an electronic device according to an embodiment of the disclosure.

Referring to FIG. 6, a schematic structural diagram of a computer system 600 adapted to implement an electronic device of the embodiments of the present disclosure is shown. The electronic device shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a touch screen, a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquiring unit, a determining unit, a first establishing unit, and a generating unit, where the names of these units do not in some cases constitute a limitation to such units themselves. For example, the acquiring unit may also be described as "a unit for acquiring a historical click log."

In another aspect, some embodiments of the present disclosure further provide a computer-readable storage medium. The computer-readable storage medium may be the computer storage medium included in the electronic device in the above described embodiments, or a stand-alone computer-readable storage medium not assembled into the electronic device. The computer-readable storage medium stores one or more programs. The one or more programs, when executed by an electronic device, cause the electronic device to: acquiring a historical click log, the historical click log comprising a historical search term and a clicked historical search result corresponding to the historical search term; determining whether matching clicked historical search results exist in the historical click log; establishing a synonymous relationship between historical search terms corresponding to the matching clicked historical search results, in response to determining the matching clicked historical search results existing in the historical click log; and generating a relational word list based on the established synonymous relationship.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, comprising:
   acquiring a historical click log, the historical click log comprising a historical search term and a clicked historical search result corresponding to the historical search term;
   determining whether matching clicked historical search results exist in the historical click log, wherein determining whether matching clicked historical search results exist in the historical click log comprises matching a first clicked historical search result with a second clicked historical search result;
   establishing a synonymous relationship between historical search terms corresponding to the matching clicked historical search results, in response to determining the matching clicked historical search results existing in the historical click log; and
   generating a relational word list based on the established synonymous relationship,
   wherein the method is performed by at least one processor.

2. The method according to claim 1, wherein the historical search result comprises a uniform resource locator (URL); and
   the determining whether matching clicked historical search results exist in the historical click log comprises:
   determining whether there is an identical URL in the clicked historical search results in the historical click log.

3. The method according to claim 1, wherein the historical search result comprises title information; and
   the determining whether matching clicked historical search results exist in the historical click log comprises:
   determining whether there is identical or similar title information in the clicked historical search results in the historical click log.

4. The method according to claim 3, further comprising:
   determining, for clicked historical search results corresponding to historical search terms including a synonymous relationship, whether an identical character string exists between pieces of title information;
   establishing a near-synonymous relationship between the character string and the corresponding historical search terms, in response to determining the identical character string existing between the pieces of title information; and
   storing the established near-synonymous relationship into the relational word list.

5. The method according to claim 1, wherein the generating a relational word list based on the established synonymous relationship comprises:
   selecting historical search terms including a synonymous relationship meeting a preset condition using statistical machine translation based on the established synonymous relationship, and generating a relational word list.

6. The method according to claim 5, wherein the statistical machine translation comprises a statistical translation model trained with training data to perform translations on words.

7. The method according to claim 1, further comprising:
   receiving a search request sent by a user, and acquiring a search result corresponding to the search request;
   matching the search request in the relational word list;
   marking a target character string in the search result in response to determining that a search term matching a word in the relational word list exists in the search request, wherein the target character string is a character string including a word, in the relational word list, including a relationship with the matched search term in the search request; and
   generating a page including the search result, and sending the page to the user.

8. An apparatus for generating information, comprising:
   at least one processor; and
   a memory storing instructions, the instructions when executed by the at least one processor, cause the at least one processor to perform operations, the operations comprising:
   acquiring a historical click log, the historical click log comprising a historical search term and a clicked historical search result corresponding to the historical search term;
   determining whether matching clicked historical search results exist in the historical click log, wherein determining whether matching clicked historical search results exist in the historical click log comprises matching a first clicked historical search result with a second clicked historical search result;
   establishing a synonymous relationship between historical search terms corresponding to the matching clicked historical search results, in response to determining the matching clicked historical search results existing in the historical click log; and
   generating a relational word list based on the established synonymous relationship.

9. The apparatus according to claim 8, wherein the generating a relational word list based on the established synonymous relationship comprises:
   selecting historical search terms including a synonymous relationship meeting a preset condition using statistical machine translation based on the established synonymous relationship, and generating a relational word list.

10. The apparatus according to claim 8, the operations further comprising:
    receiving a search request sent by a user, and acquiring a search result corresponding to the search request;
    matching the search request in the relational word list;
    marking a target character string in the search result in response to determining that a search term matching a word in the relational word list exists in the search request, wherein the target character string is a character string including a word, in the relational word list, including a relationship with the matched search term in the search request; and generating a page including the search result, and sending the page to the user.

11. A non-transitory computer storage medium storing a computer program, the computer program when executed by one or more processors, causes the one or more processors to perform operations, the operations comprising:
- acquiring a historical click log, the historical click log comprising a historical search term and a clicked historical search result corresponding to the historical search term;
- determining whether matching clicked historical search results exist in the historical click log, wherein determining whether matching clicked historical search results exist in the historical click log comprises matching a first clicked historical search result with a second clicked historical search result;
- establishing a synonymous relationship between historical search terms corresponding to the matching clicked historical search results, in response to determining the matching clicked historical search results existing in the historical click log; and
- generating a relational word list based on the established synonymous relationship.

* * * * *